July 5, 1938.  M. LANGA  2,123,075

METHOD OF CULTIVATING PLANTS

Filed April 15, 1937

INVENTOR
Morris Langa
BY
Harry Sangsam
ATTORNEY

Patented July 5, 1938

2,123,075

UNITED STATES PATENT OFFICE 2,123,075

METHOD OF CULTIVATING PLANTS

Morris Langa, Philadelphia, Pa.

Application April 15, 1937, Serial No. 136,977

1 Claim. (Cl. 47—34)

My invention relates to flower pots and relates more particularly to pliable or resilient flower pots.

In the raising and care of potted plants, one of the chief difficulties in the way of their satisfactory growth is the tendency of the soil or earth to pack down and become hard. When this condition occurs, it is the customary practice to disturb and loosen the earth about the plant with a sharp stick or other implement. Prodding of the soil in this manner may damage the plant roots and generally is an unsatisfactory procedure in that only the surface of the soil is crumbled leaving the earth underneath compacted.

The supply of water in the soil is the most important of the factors in the cultivation of plants. Water is not only the chief food of plants, but it is the carrier of other plant foods which come from the soil. The proper control of soil water, therefore, is one of the most important considerations in proper soil management. It is necessary to have a soil in such condition that the excess water will readily drain away, while the soil retains the amount necessary to the proper growth of the plants.

Air in the soil is necessary to the proper growth of plants.

The pore or air space in the soil is from 30 per cent to 60 per cent of the volume. About 50 per cent of the volume of plant soil, if in good physical condition, is pore space. When plants are watered, the water penetrates into the openings, between the particles. When these openings are filled with water, the soil is said to be saturated. The air is thus forced out of the soil, and until a large part of this water drains away so that the air can again enter the soil openings, plants will not flourish. Plants on a saturated soil soon turn yellow, and if the water remains long enough, they will die.

Hence, by having the soil in the cultivation of plants in a loose, friable, or crumbly condition, the water may properly permeate the soil to the benefit of the plant.

It is the principal object of my invention to provide a distortable container for use as a flower pot which may be externally distorted to make the earth in the container friable without injury to the plant.

With the foregoing and other objects in view which will become apparent as the description proceeds, my invention embodies a flower pot made of rubber or cloth or similar pliable material adapted to be rolled between the hands, thereby agitating and loosening the earth contained therein without damage to the plant or its roots.

Other objects of my invention are to provide an improved device of the character described, that is easily and economically produced, and which is unbreakable as is the ordinary clay flower pot.

With the above and related objects in view, my invention consists in the details of construction and combination of parts, as will be more fully understood from the following description, when read in conjunction with the accompanying drawing in which:—

Figure 1:
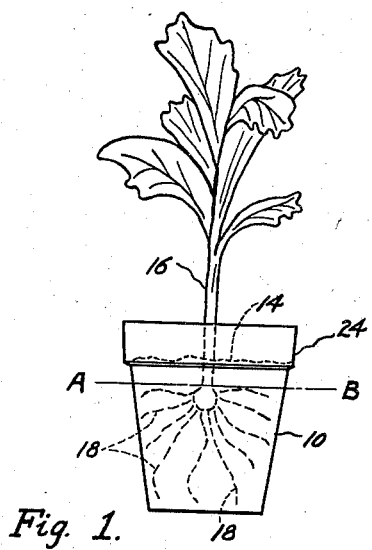
Fig. 1 is a side elevation of a plant in the pot of my invention.

Referring now to the drawing, I have shown in Fig. 1 a flower pot 10 of conventional shape filled with soil or earth 12 to the level 14 and holding a plant 16 with roots 18. The pot 10 is composed of rubber or cloth or any other distortable material, so that it will substantially maintain its shape under conditions of ordinary use, but will be pliable enough to permit being squeezed and rolled between the hands as illustrated in Figs. 2 and 3.

Figure 3:
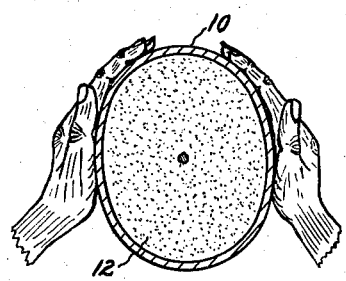
Figs. 2 and 3 are sectional views of the pot of Fig. 1, taken on the line AB, illustrating the pot as it is manually squeezed and rolled.

To loosen or crumble the earth in the pot 10, grasp the pot between the hands in the manner illustrated in Fig. 3, and roll it gently back and forth between the hands until the desired degree of looseness of earth is obtained.

Figure 2:
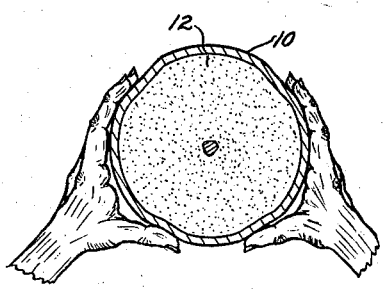

If preferred, the pot may be grasped and manipulated in the manner illustrated in Fig. 2—the earth therein being gradually loosened by the pressure of the fingers on the outside of the container.

Loosening of the earth in potted plants is essential if flourishing plants are desired. Ordinary poking, besides being harmful to the roots, is difficult to do and is seldom done with requisite thoroughness. My method of performing this necessary function produces a uniform loosening of earth throughout the pot, permits efficient capillary action, and results in healthier plants.

Subsequent watering of the plant with the soil in a friable condition promotes healthy plant growth.

Figure 4:
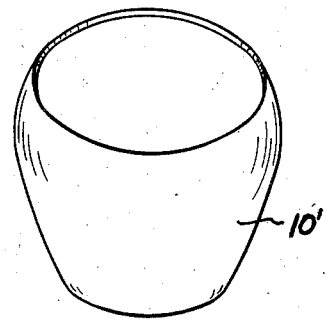
Fig. 4 is a perspective view of a modification of my invention.

Another modification of my invention is illustrated in Fig. 4 which shows a flower pot 10' of pliable or resilient material formed in the shape of a bowl where the sides bulged outwardly.

Another modification of my invention may consist of a hollow prismatic container having flexible or distortable sides and a rigid base.

Although I have described the pot of my invention as homogeneous in construction, it is also within the scope of my invention for various parts of the pot to be of various degrees of flexibility. For example, in the large sizes and to permit the use of thinner material, the base may be quite stiff to lend support and retain the shape. Again, the rim 24 may also be suitably stiffened to insure the circular shape.

The base of each of the flower pots illustrated or described may have one or more holes therein so that the water may drain from the container or the base may be optionally constructed of the same type of material as the side walls or of a more rigid type of material.

It should be apparent that the purpose of this invention is not to compact the soil around the roots of the plant but to have the soil exposed as it ordinarily has been in the flower pots heretofore used. A pliable type of flower pot not only enables the upper surface of the soil to be crumbled as would be the case if a stick or spade were used to disturb the upper surface of the soil, but also to crumble all the soil in the flower pot.

In the clay type of flower pots, it is impossible to disturb or crumble the soil in the lower portion of the flower pot in order to render that soil friable.

Although my invention has been described in considerable detail, such description is intended as illustrative rather than limiting, since the invention may be variously embodied, and the scope of the invention is to be determined as claimed.

I claim as my invention:—

A method of cultivating plants in flexible or distortable containers which comprises the following steps:—pressing on the vertically extending wall of said flexible or distortable flower pot to loosen the soil above and about the roots of said plant, and subsequently watering the soil.

MORRIS LANGA.